(12) United States Patent
van de Beek et al.

(10) Patent No.: US 9,077,571 B2
(45) Date of Patent: Jul. 7, 2015

(54) ADAPTIVE EQUALIZER AND/OR ANTENNA TUNING

(75) Inventors: Remco Cornelis Herman van de Beek, Eindhoven (NL); Massimo Ciacci, Den Bosch (NL)

(73) Assignee: NXP B.V., Eindhoven (NL)

( * ) Notice: Subject to any disclaimer, the term of this patent is extended or adjusted under 35 U.S.C. 154(b) by 893 days.

(21) Appl. No.: 13/229,070

(22) Filed: Sep. 9, 2011

(65) Prior Publication Data

US 2013/0064271 A1    Mar. 14, 2013

(51) Int. Cl.
| | |
|---|---|
| *H04L 25/49* | (2006.01) |
| *H03K 5/159* | (2006.01) |
| *H04L 25/02* | (2006.01) |
| *H04L 25/03* | (2006.01) |
| *H04B 5/00* | (2006.01) |

(52) U.S. Cl.
CPC .......... *H04L 25/0266* (2013.01); *H04B 5/0081* (2013.01); *H04L 25/03343* (2013.01)

(58) Field of Classification Search
CPC .................. H04L 25/03343; H04L 25/03057; H04L 2025/03375; H04L 2025/03617; H03G 3/3084; H04B 5/0081
USPC ................. 375/219, 285, 295, 296, 344, 326, 375/279–281, 308, 329, 229, 232, 233; 329/304, 306; 332/103, 106, 107, 123, 332/159
See application file for complete search history.

(56) References Cited

U.S. PATENT DOCUMENTS

| 6,983,026 B2 | 1/2006 | Pinckley et al. |
|---|---|---|
| 7,388,926 B2 | 6/2008 | Ishikawa et al. |
| 2003/0058959 A1* | 3/2003 | Rafie et al. .................... 375/296 |
| 2003/0202615 A1* | 10/2003 | Bach et al. .................... 375/296 |

(Continued)

FOREIGN PATENT DOCUMENTS

| CN | 1647395 A | 7/2005 |
|---|---|---|
| CN | 1691660 A | 11/2005 |
| CN | 101523759 A | 9/2009 |
| CN | 101741779 A | 6/2010 |

OTHER PUBLICATIONS

Finkenzeller, K. "RFID Handbook Fundamentals and Applications in Contactless Smart Cards and Identification" Second Edition, John Wiley & Sons Ltd, West Sussex, England, p. 97-103, (2003).

(Continued)

*Primary Examiner* — Tesfaldet Bocure (57) ABSTRACT

Equalization circuits and methods are implemented for a variety of applications. According to one such application, a transmitting device wirelessly communicates using an antenna. The device has a transmission circuit that is configured and arranged to transmit a first wireless signal using magnetic coupling between the antenna and a remote device, the coupling occurring over a wireless medium. A receiver circuit of the transmitting device is configured and arranged to receive a second wireless signal that is from the antenna and that represents the first wireless signal as modified by the coupling occurring over the wireless medium. An error circuit of the device is configured and arranged to generate an error signal by comparing the first wireless signal to the second wireless signal. An equalizer circuit of the device is configured and arranged to pre-code the first wireless signal with coding that compensates for inter-symbol interference by compensating for the error signal.

19 Claims, 9 Drawing Sheets

(56) References Cited

U.S. PATENT DOCUMENTS

| | | | |
|---|---|---|---|
| 2005/0271169 A1* | 12/2005 | Momtaz et al. | 375/345 |
| 2009/0227215 A1* | 9/2009 | McCallister | 455/114.3 |
| 2010/0046601 A1* | 2/2010 | Momtaz et al. | 375/233 |
| 2010/0048146 A1* | 2/2010 | McCallister | 455/78 |
| 2010/0128771 A1 | 5/2010 | Muramatsu et al. | |
| 2010/0134255 A1 | 6/2010 | Witsching | |
| 2010/0134256 A1 | 6/2010 | Mihota | |
| 2010/0328045 A1 | 12/2010 | Goto et al. | |
| 2011/0210789 A1 | 9/2011 | Ohkawara et al. | |
| 2012/0108189 A1* | 5/2012 | McCallister et al. | 455/127.2 |

OTHER PUBLICATIONS

"Identification Cards—Contactless Integrated Circuit(s) Cards—Proximity Cards—Part 2: Radio Frequency Power and Signal Interface—Amendment 1 Bits Rates Higher Than fc/16 and up to fc" ISO/IEC, 29 pgs. (Mar. 9, 2011).

Lunglmayr, M. et al. "Least Square Equalization for RFID", IEEE Second International Workshop on Near Field Communication, pp. 90-94 (Apr. 2010).

"Complex Multiplication", Wolfram MathWorld, 1 pg., retrieved from the Internet at: (Aug. 2, 2012) http://mathworld.wolfram.com/ComplexMultiplication.html (Jul. 27, 2012).

"Q factor", Wikipedia, 8 pgs., retrieved from the Internet at: (Aug. 2, 2012) http://en.wikipedia.org/wiki/Quality_factor (Jul. 31, 2012).

Haykin, S. "Adaptive Filter Theory ($3^{rd}$ Edition)", Prentice Hall Inc., pp. 339-344 (1996).

CN office action from counterpart patent appln. No. CN 201210325743.7 (Jul. 11, 2014).

"Identification cards—Contactless integrated circuit cards—Proximity cards—Part 2: Radio Frequency power and signal interface" ISO/IEC 14443-2 Second edition (International Organization for Standard and International Electrotechnical Commission), 32 pgs (Sep. 1, 2010).

* cited by examiner

FIG. 9

ADAPTIVE EQUALIZER AND/OR ANTENNA TUNING

BACKGROUND OF THE INVENTION

Near field communication (NFC) devices that are configured according to ISO 18092, ISO 14443 and ETSI allow bidirectional communication between two devices based on RF technology. These devices can feature different operating modes including: tag emulation, NFC peer to peer and reader/writer mode. Proximity coupling devices (PCD) include a circuit that emits an electromagnetic field that powers a proximity integrated circuit card (PICC) (e.g., a tag or transmitter) by inductive/magnetic coupling.

The antenna of a PCD consists of an inductor $L_r$ that emits the magnetic field that is used both to power the (passive) PICC, and to carry the data during transmission via mutual inductance M. To make the PCD transmitter energy efficient, the antenna inductor can be combined with a capacitive network $C_r$, such that the antenna is part of a resonator. For efficient power transfer from the PCD to the (often batteryless) PICC, as well as for energy efficiency of the PCD itself, the PCD's antenna resonator can be tuned to the carrier frequency used in transmission. A resistor $R_r$ can provide dampening in order to increase the transmit bandwidth. The voltage across this resistor can also be used to detect the signal emitted by the PICC (typically using load modulation).

Applications based on inductively-coupled radio frequency identification technologies have evolved from simple presence detection to more advanced applications such as electronic passports and ticketing, contactless smartcards and NFC communication in mobile phones. This evolution comes with a demand for increased data rates, which led to recent proposals to amend the ISO/IEC 14443 (proximity coupling) standard to support data rates of several Mbit/s. Combining the increased data rates with an energy efficient antenna structure is a challenging task.

BRIEF SUMMARY OF THE INVENTION

Various example embodiments are directed to pre-equalization in wireless transmission circuits and approaches, and to addressing various challenges including those discussed herein.

According to an example embodiment of the present disclosure, a digital implementation of an adaptive pre-equalizer is provided that can reuse a receiver structure that is present for receiving data at the PCD for the additional purpose of obtaining feedback about the transfer function relative to transmitted data. This feedback can be used in adapting the equalization to the transfer function. The coefficients of a simple finite impulse response (FIR) filter are continually adjusted to create an overall frequency-independent sampled transfer function, thus pre-equalizing the inter-symbol interference (ISI) under unknown and varying channel conditions.

According to other embodiments of the present disclosure, a transmitting device wirelessly communicates using an antenna. The device has a transmission circuit that is configured and arranged to transmit a first wireless signal using magnetic coupling between the antenna and a remote device, the coupling occurring over a wireless medium. A receiver circuit of the transmitting device is configured and arranged to receive a second wireless signal that is from the antenna and that represents the first wireless signal as modified by the coupling occurring over the wireless medium. An error circuit of the device is configured and arranged to generate an error signal by comparing the first wireless signal to the second wireless signal. An equalizer circuit of the device is configured and arranged to pre-code the first wireless signal with coding that compensates for ISI by adjusting the equalization in response to the error signal.

Consistent with various embodiments of the present disclosure, a bidirectional wireless communications device includes a transmit path and a receive path. The transmit path has an equalizer circuit configured and arranged to pre-code a first digital data with coding that compensates for ISI that is represented by an error signal. A digital to analog converter circuit in the transmit path is configured and arranged to produce an analog transmit signal from the pre-coded first digital data. The transmit path also includes an up-conversion circuit that is configured and arranged to generate a passband signal by modulating a carrier frequency component to the baseband transmit signal. An amplifier circuit of the transmit path is configured and arranged to provide an amplified version of the passband signal to an antenna. The receive path includes a down-conversion circuit that is configured and arranged to generate an analog baseband receive signal by demodulating the passband signal. An analog to digital converter circuit of the receive path is configured and arranged to produce second digital data from the analog receive signal. An error circuit of the receive path is configured and arranged to generate the error signal by comparing the first digital data to the second digital data.

Additional aspects of the present disclosure are directed towards a method that includes transmitting, using a transmission circuit, a first wireless signal using magnetic coupling between the antenna and a remote device, the coupling occurring over a wireless medium. A receiver circuit is used to receive a second wireless signal that is from the antenna and that represents the first wireless signal as modified by the coupling occurring over the wireless medium. An error circuit is used to generate an error signal by comparing the first wireless signal to the second wireless signal. An equalizer circuit is then used to precode the first wireless signal with coding that compensates for ISI interference by compensating for the error signal. The error signal can also be used to drive an adaptive tuning circuit which retunes the transmitter antenna.

The above discussion is not intended to describe each embodiment or every implementation of the present disclosure. The figures and following description also exemplify various embodiments.

BRIEF DESCRIPTION OF THE DRAWINGS

Various example embodiments may be more completely understood in consideration of the following detailed description in connection with the accompanying drawings, in which.

DETAILED DESCRIPTION OF INVENTION

While the disclosure is amenable to various modifications and alternative forms, specifics thereof have been shown by way of example in the drawings and will be described in detail. It should be understood, however, that the intention is not to limit the disclosure to the particular embodiments described. On the contrary, the disclosure is to cover all modifications, equivalents, and alternatives falling within the scope of the disclosure including aspects defined in the claims.

The present disclosure is believed to be applicable to a variety of different types of circuits, devices and systems for and/or involving pre-equalization and/or adaptive tuning in wireless devices. While the present disclosure is not necessarily limited in this context, various aspects of the disclosure may be appreciated through a discussion of related examples.

In accordance with various example embodiments of the present disclosure, a wireless communications device is provided for use in near field communications (NFC). The device includes a transmission circuit that is configured and arranged to transmit wireless signals using magnetic coupling between the antenna and a remote device. A receiver circuit of the transmitting device is configured and arranged to receive a wireless signal from the antenna. This received wireless signal represents the transmitted wireless signal as modified by transmission over the wireless medium. An error circuit of the device is configured and arranged to generate an error signal by comparing the first wireless signal to the second wireless signal. An equalizer circuit of the device is configured and arranged to pre-code transmitted data with coding that compensates for inter-symbol interference by adjusting the transmitted signal according to the error signal.

Embodiments of the present disclosure are directed towards reducing inter-symbol interference using pre-equalization (before transmission) that utilizes a receiver circuit path that is connected to the same antenna that is used to transmit the pre-equalized data. It has been recognized that the transmitting antenna can be used to accurately determine the pre-equalization coding for converging upon a desired transfer function. This allows for the transfer function of the pre-equalization to be continuously adapted. Such adaptability can be particularly useful for combating inter-symbol interference (ISI) in near field communication (NFC) applications operating at 1 Mbit/s or higher.

Aspects of the present disclosure recognize energy efficiency is achieved by keeping the damping of the resonator to a minimum (as damping is equivalent to energy loss), which is especially important in (mobile) NFC applications. However, low damping also means low transmit bandwidth due, at least in part, to high ISI. Increasing the symbol rate, e.g., to increase the data rate in various ISO14443 amendment proposals, leads to an increase in data bandwidth and also to an increase in ISI due to the antenna resonator. Therefore, meeting ISI requirements becomes more challenging for the higher data rates. These higher data rates can include, but are not limited to, systems with data rates above 1 Mbit/s.

ISI can be reduced by increasing the antenna damping; however, this dampening can reduce power efficiency. Accordingly, embodiments of the present disclosure are directed toward reducing ISI using some equalization. Generally speaking, equalization can occur either before transmitting (pre-equalization) or after reception (post-equalization), or a combination of both. In the case of data transmission from PCD to PICC, aspects of the present disclosure recognize that post-equalization has various disadvantages, e.g., it requires additional processing power from the (passive) PICC. Moreover, the fact that a PICC extracts its power from the magnetic field typically distorts the data signal in a non-linear fashion, making the post-equalization process more difficult. Accordingly, embodiments of the present disclosure are designed to use PCD pre-equalization of the transmitted signal in order to improve the received signal quality.

Pre-equalization is complicated by the fact that the channel that needs to be compensated is not completely known a priori. This is due to the influence the PICC has on the antenna resonator characteristics, via the unknown mutual inductance M, which depends also on the varying PICC location, and the unknown value of $L_c$. Moreover, the characteristic of the PCD resonator itself, including its resonance frequency, may not be completely known a priori, e.g., due to parameter spread. Surprisingly, even a small mis-adjustment (even on the order of 1%) in the PCD resonance frequency can lead to serious ISI effects at high data rates. Accordingly, embodiments of the present disclosure are directed toward a pre-equalizer that can continuously adapt its transfer to the channel in order to effectively combat ISI.

In order to realize an adaptive pre-equalizer, feedback is used to compare the signals as transmitted (including ISI) to the required (ISI free) transmitted symbols. Since some transmitters (e.g., PCDs) already contain a receiver chain for reading information from a PICC, the receiver circuit hardware can be re-used to provide such feedback.

Figure 1:
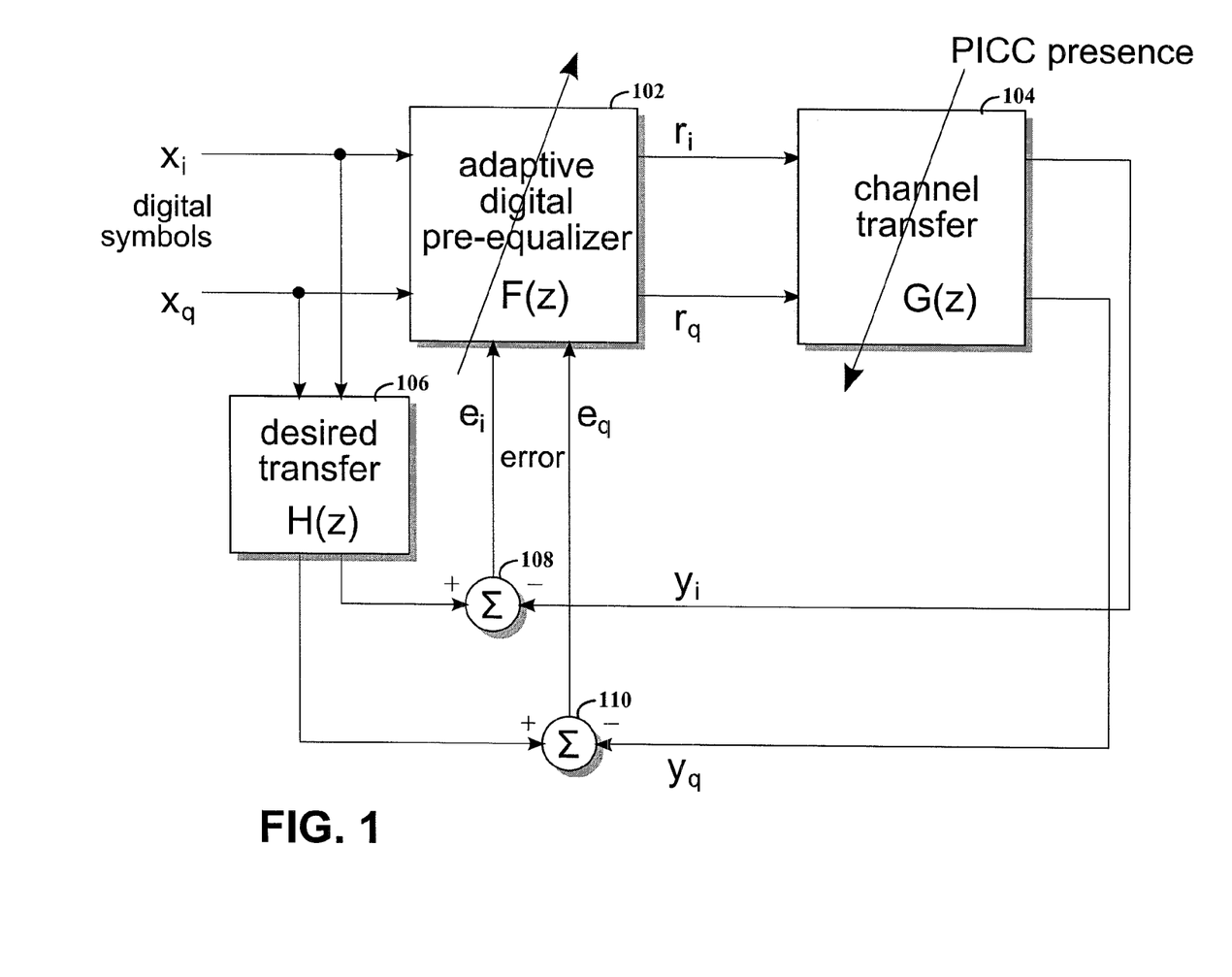
FIG. 1 depicts a block diagram for an adaptive loop, consistent with embodiments of the present disclosure.

FIG. 1 depicts a block diagram for an adaptive loop, consistent with embodiments of the present disclosure. Although not necessarily limited to such a representation, the digital symbols for transmission are represented by two data signals $x_i$ and $x_q$. The use of these two symbols is consistent with various signaling modes for which that complex signaling might be used. For example, complex signaling can be used in the phase-shift keying (PSK) mode, which has been proposed for the very high data rates ISO14443 amendment. Adaptive (digital) pre-equalizer 102 is configured to adjust the data symbols in order to compensate for a difference between a desired transfer function H(z) 106 and the actual channel transfer function G(z) 104. The actual transfer function G(z) 106 generates resultant data signals $y_i$ and $y_q$, which are compared to the output of the desired transfer function 106 using summation/comparator blocks 108 and 110. Blocks 108 and 110 generate error signals $e_i$ and $e_q$. The resultant data signals are obtained using a data read path connected to the same antenna used to transmit the two data signals $x_i$ and $x_q$.

Adaptive (digital) pre-equalizer 102 is configured and arranged to adaptively pre-code the data signals according to F(z) so that the data signals $y_i$ and $y_q$ converge to data signals corresponding to the desired transfer function 106. Additional details of example embodiments consistent with such a pre-equalizer are discussed herein.

In a PCD system, the transmit antenna resonator acts on the HF (up-converted) signal in that it limits its bandwidth. To design an equalizer to counteract the effect of this resonator, it can be useful to use the concept of a baseband equivalent system, where the effect of the resonator on the data signal is modeled by a baseband filter that influences the signal before up-conversion; the antenna is then thought of as an ideal element, not influencing the signal spectrum. Since the antenna filtering can be thought of as occurring in baseband, the equalization process to counteract the antenna filtering can also be implemented in baseband. Thus, FIG. 1 depicts how a digital pre-equalizer filter can neutralize the filtering introduced by the antenna resonator and cancel ISI.

Modeling of the exact time-discrete baseband equivalent transfer function of the PCD has shown that the resonator can be modeled using a single-pole time-discrete transfer function. Embodiments of the present disclosure are therefore directed towards an implementation of the digital pre-equalizer that inverts this transfer function to counteract ISI in the transmitted magnetic field. For instance, to invert the single pole present in the baseband equivalent transfer function, a single zero is introduced. This can be done using a single-tap FIR filter.

The introduction of a PICC in the transmitted magnetic field complicates things, due to the coupled inductor pair (represented by mutual inductance M). This coupling can be shown to cause a shift of the complex pole pair introduced by the antenna resonator. In the context of a FIR-based pre-equalizer that uses fixed coefficients, this shift means that the ISI would not be completely cancelled since the introduced zero is not on top of the baseband pole anymore. Therefore, according to an adaptive solution discussed herein, the zero location is continually updated to match the pole location.

Aspects of the present disclosure recognize that the PICC antenna introduces a new complex pole pair in the PCD transfer function. This second pole pair can have a much lower associated time constant and can therefore be neglected in certain embodiments of the present disclosure. Alternatively, the second pole pair can be compensated by introducing a second tap in the FIR filter (thus introducing a second zero in the FIR transfer).

Figure 2:
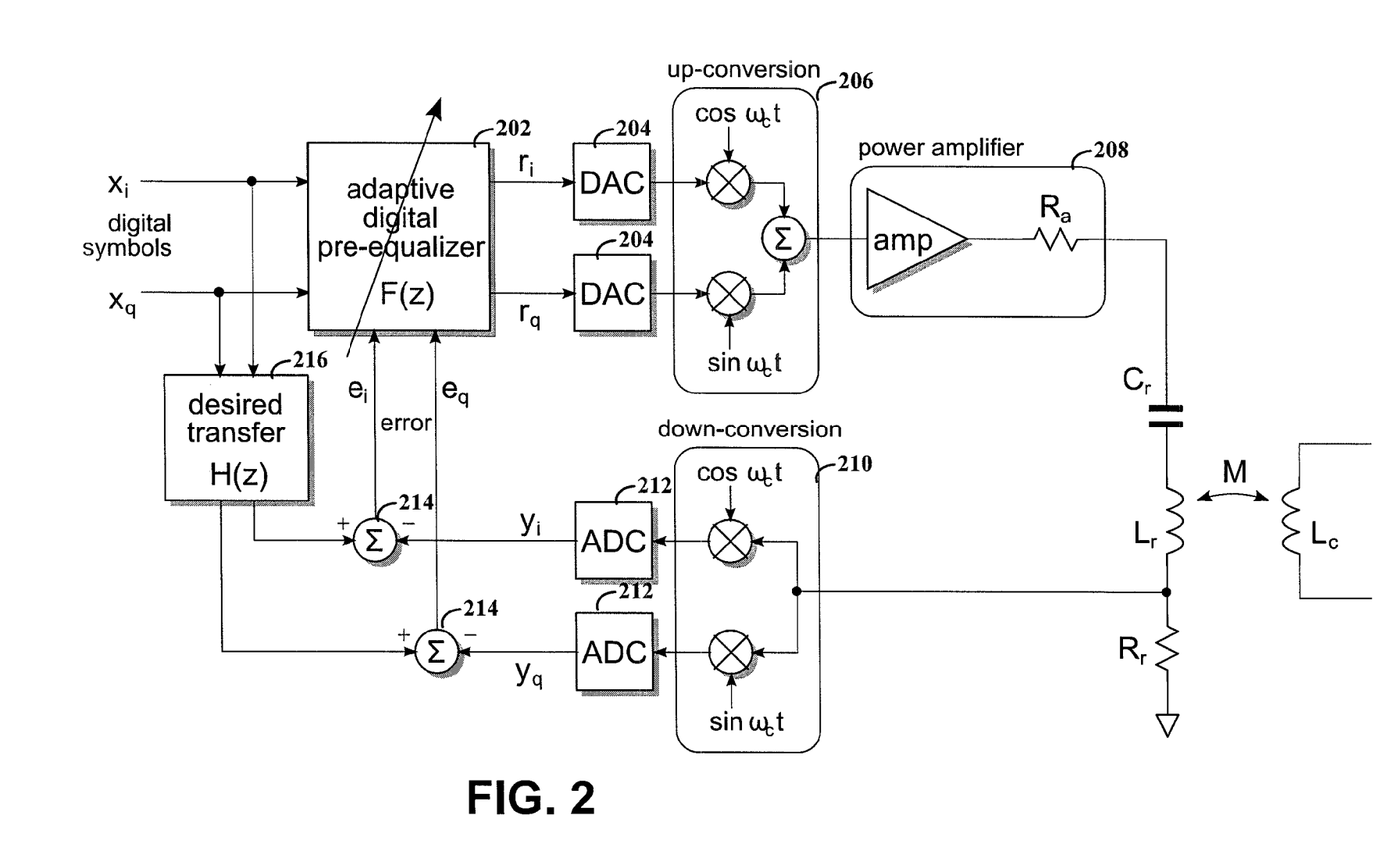
FIG. 2 depicts a block diagram of a PCD including receiver hardware and a pre-equalizer block, consistent with embodiments of the present disclosure.

FIG. 2 depicts a block diagram of a PCD including receiver hardware and a pre-equalizer block, consistent with embodiments of the present disclosure. The block diagram includes both a transmit path and a receive path. The transmit path is shown as including elements 204-208, while the receive path is shown as including elements 210-214. Certain embodiments allow for the receive path to also be (re)used for other functions, such as receiving and decoding data from an external device. Other embodiments use the receive path only for feedback to the pre-equalizer.

Data signals $x_i$ and $x_q$ represent the digital symbols to be transmitted. Adaptive (digital) pre-equalizer 202 is configured to adjust the data symbols in order to compensate for a difference between a desired transfer function H(z) 216 and the actual channel transfer function G(z), which includes the effects of mutual inductance M that exists between antennas $L_r$ and $L_c$. The "desired transfer" function represents an ISI-free transfer function to which the system is designed to converge.

A transmitter circuit includes an (Cartesian) up-converter 206 that generates a pass band signal by adding a carrier frequency component. The up-converter 206 up-converts an analog signal received from digital-to-analog conversion (DAC) block 204 to a high-frequency (HF) signal. Alternative embodiments of the present disclosure recognize that DAC 204 can directly generate the RF (modulated) signal without the need for an extra up-conversion circuit/step. Thus, the DAC 204 can perform the up-conversion in the digital domain. In such embodiments, the DAC 204 is configured and arranged to generate a passband signal by adding a carrier frequency component to the analog transmit signal and the up-converter 206 is effectively part of the DAC 204.

Power amplifier 208 amplifies the up-converted signal and provides this amplified signal to the antenna $L_r$. The power amplifier's output resistance is shown as a resistor $R_a$.

A receiver circuit produces data signals $y_i$ and $y_q$, from a signal received from the antenna $L_r$. This received signal has been modified according to the channel transfer function G(z). The receiver circuit contains a (Cartesian) down-converter 210 and an analog-to-digital conversion block 212. The output of the analog-to-digital conversion block 212 is compared to the output of the desired transfer function 216 using summation/comparator block(s) 214. The summation/comparator block(s) 214 generate error signals $e_i$ and $e_q$.

The receiver circuit depicted in FIG. 2 does not include carrier suppression; however, the present disclosure is not so limited. Various embodiments of the present disclosure contemplate the use of carrier suppression as discussed in more detail hereafter. It is also noted that the sample frequency 1/T used by the DAC, ADC and the digital blocks themselves might be a (integer) multiple of the symbol frequency.

According to the time-discrete baseband equivalent model, the complete transceiver chain between $r_{i/q}$ and $y_{i/q}$ (DAC, up-converter, power amplifier, antenna, down-converter and ADC) can be modeled using a single-pole discrete transfer function G(z) (considering $r_i$ and $r_q$ being the real and imaginary part of complex signal r):

$$Y(z) = R(z)G(z) = R(z) \cdot \frac{g_z \cdot z^{-1}}{1 - p_z \cdot z^{-1}}$$

where $g_z$ is the complex gain of the chain and $p_z$ the dominant pole introduced by the antenna resonator. Both of these values can be unknown a priori due to the unknown mutual inductance with the PICC. For certain embodiments of the present disclosure, it can be assumed that all extra parasitic poles introduced by the analog chain are well outside the frequency range of interest.

Figure 3:
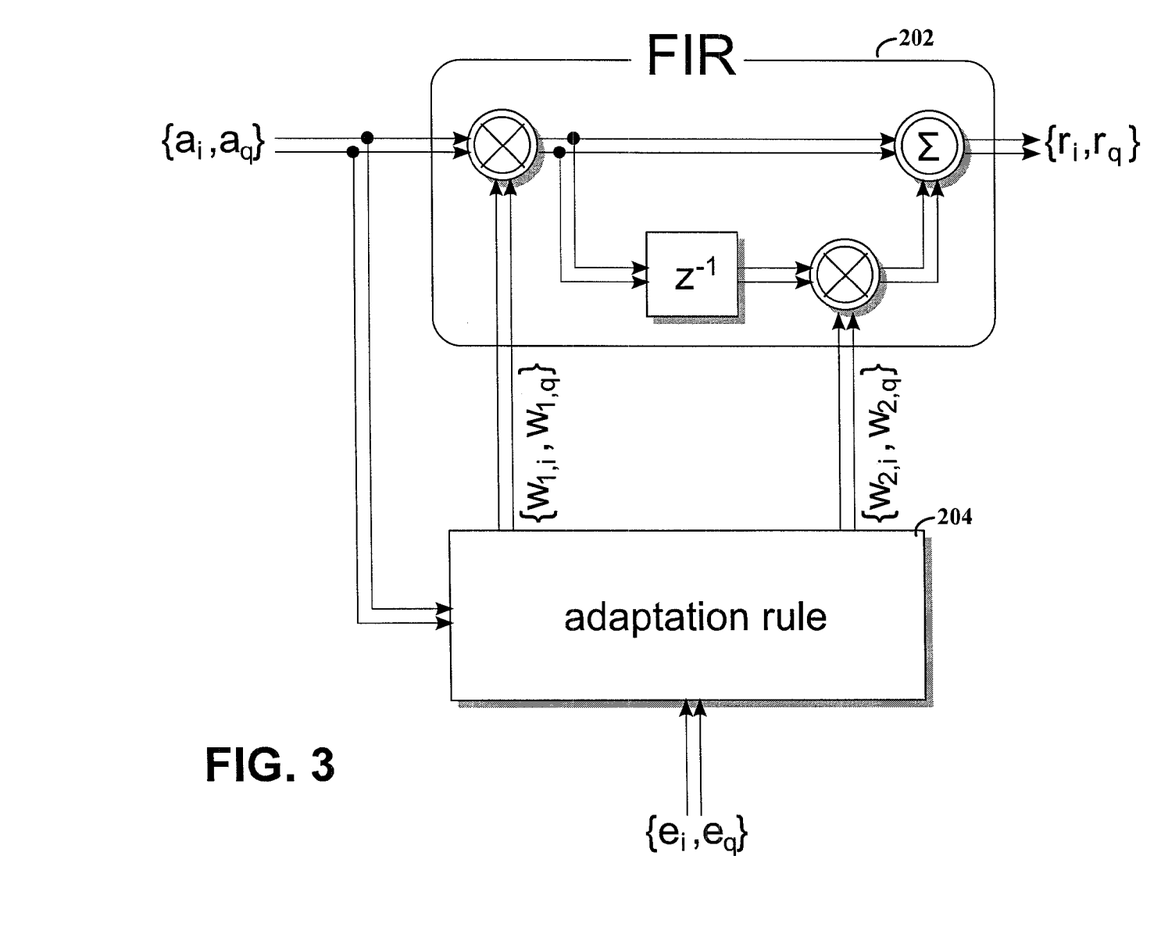
FIG. 3 depicts a block diagram for a one-tap FIR equalizer circuit, consistent with embodiments of the present disclosure.

FIG. 3 depicts a block diagram for a one-tap FIR equalizer circuit, consistent with embodiments of the present disclosure. For an ISI-free symbol transmission, the total transfer function F(z)G(z) is adjusted to be frequency independent. The circuit shown in FIG. 3 accomplishes this frequency independence by adapting its complex coefficients $w_1$ and $w_2$ using a certain adaptation rule 204, such that F(z)G(z) equals H(z) after loop convergence (where the desired transfer function H(z) is frequency independent). A finite impulse response (FIR) filter 202 includes circled multipliers that are full complex multipliers (using four real multipliers and two adders, or three multipliers and five adders), and a circled adder that is a full complex adder (with two real adders).

The filter has a transfer function F(z):

$$F(z)=w_1(1+w_2 z^{-1})$$

so when $w_1$ equals $1/g_z$ and $w_2$ equal $-p_z$, the total transfer F(z)·G(z) would become $z^{-1}$ (one-sample delay). To obtain this result, H(z) is therefore set to equal $z^{-1}$:

$$H(z)=z^{-1}$$

The adaptation rule block is designed to make $w_1$ and $w_2$ converge to the above-mentioned values, based on the measured error values. FIG. 3 depicts but one example implementation. Other FIR architectures may be used.

Figure 4:
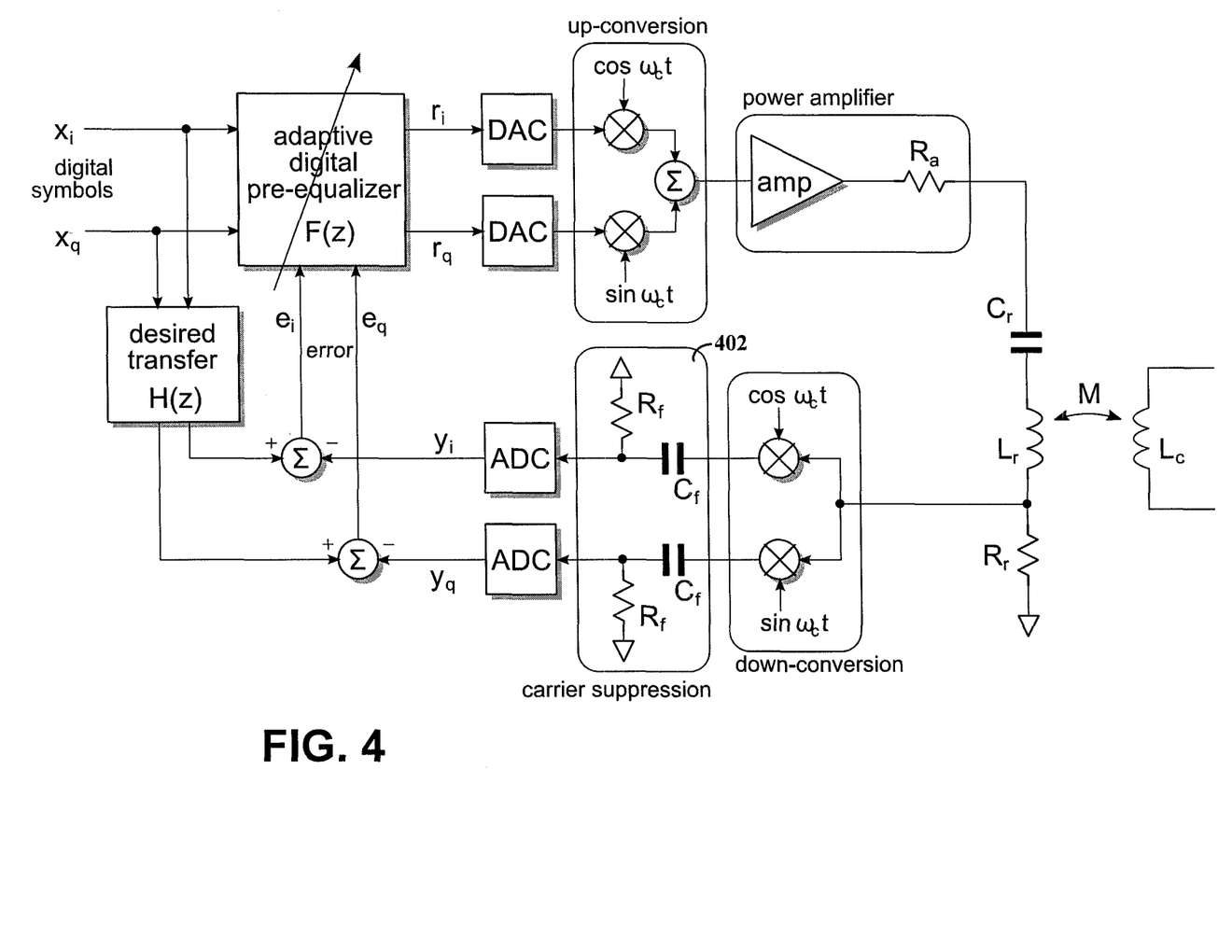
FIG. 4 depicts a block diagram of a circuit with carrier suppression circuitry, consistent with embodiments of the present disclosure.

FIG. 4 depicts a block diagram of a circuit with carrier suppression circuitry, consistent with embodiments of the present disclosure. Much of the circuitry described in connection with FIG. 3 is replicated; however, FIG. 4 also depicts a first-order high-pass filter 402 between the down-conversion mixers and the ADCs. Consistent with certain embodiments of the present disclosure, a model of this high-pass filter 202 is added into the desired transfer H(z).

For the depicted first-order RC implementation, the total H(z) would become $$H(z) = z^{-1} \cdot \frac{1-z^{-1}}{1-p_{hp}z^{-1}} \text{ with } p_{hp} = e^{\frac{-T}{R_f C_f}}$$

where T is the system sample time. The sample frequency 1/T might be a multiple of the symbol frequency. The right-hand factor $(z-1)/(z-p_{hp})$ models the high-pass filter; the delay term that was also present in H(z) without the high-pass filter model still remains.

Experimental aspects of the present disclosure have been tested using a variety of simulations. For instance, a circuit based upon FIG. 4 was simulated (including carrier suppression), where the analog chain, including DACs, ADCs as well as the carrier suppressing high-pass filter, were modeled in the time-discrete baseband domain as explained in the appendix. The antenna resonator had a quality factor equal to 18 (including the effect of $R_a$) and was mistuned 200 kHz above the carrier frequency of 13.56 MHz. The initial setting of the pre-equalizer was for an antenna quality factor of 12 and no mistuning, such that adaptation would be necessary for ISI-free transmission. PSK-modulated random symbols were used with a data rate of 6.78 Mbit/s at a symbol rate of 1.695 Msym/s. The DAC and ADC used a sample time of 3.39 M sample/s (at twice the symbol rate). The corner frequency of the carrier suppressing high-pass filter was about 10 kHz.

The equalizer was realized in the simulation according to FIG. 3. The update rule that was applied in order to adapt the equalizer's gain and zero location is:

$$w_1(n)=w_1(n-1)+\mu_1 e(n)\{x^*(n-1)+w_2^*(n-1)x^*(n-2)\}$$

$$w_2(n)=w_2(n-1)+\mu_2 e(n)w_1^*(n-1)x^*(n-2)$$

with $\mu_1$ and $\mu_2$ update gain constants. The raised asterisk operator indicates complex conjugation.

The adaptation behavior of the adaptive pre-equalizer was simulated to show that the magnitude of the error, given by $\sqrt{(e_i^2 + e_q^2)}$, quickly diminished due to increasingly better equalizer settings (better matching the actual channel). Moreover, both the gain and the zero location were shown to converge to the desired target. In the simulation, equalizer adaptation was performed during high bit rate transmission (6.78 Mbps).

Embodiments of the present disclosure recognize that the ISO14443 communication initialization phase (in which a data rate of 106 kbit/s is used) can be used to adapt the pre-equalizer because, in this phase, ISI is not a critical problem. After switching to the very high bit rate mode, the equalizer has already settled for ISI-free communication.

Embodiments of the present disclosure can be particularly useful for transceiver systems where a low-damping resonator-type antenna structure is used and which introduces inter-symbol interference that is higher than what can be dealt with easily by the receiving end. For instance, embodiments can be particularly useful for very high bit rate ISO14443-type systems (for example mobile NFC applications) that require a low-power PCD.

The following description discusses embodiments and methodology for deriving a time-discrete baseband model of the physical resonator. The physical resonator can be mathematically described as a system with one pair of complex-conjugate poles.

The complex-conjugate poles are modeled at baseband. The transfer of the power amplifier voltage $V_a$ to the resistor voltage $V_r$ is given in general by:

$$H(j\omega) \equiv g\frac{j\omega}{(j\omega - p_s)(j\omega - p_s^*)} \equiv g\frac{j\omega}{(j\omega - \sigma - j\omega_p)(j\omega - \sigma + j\omega_p)}$$

with g the gain, $p_s$ one of the complex poles and $p_s^*$ its complex conjugate. The real part of $p_s$ is $\sigma$ and its imaginary part $\omega_p$.

In the above equation, the circuit component values are not used. The equations become quite complex when the presence of the PICC is taken into account. Accordingly, it has been assumed here that there is one pair of complex conjugate poles dominating the transfer function For frequencies close to the carrier frequency o this can be written as:

$$H(j\{\omega_c + d\omega\}) = g\frac{j(\omega_c + d\omega)}{\{j(\omega+d\omega)-\sigma-j\omega_p\}\{j(\omega+d\omega)-\sigma+j\omega_p\}} =$$
$$= g\frac{j(\omega_c + d\omega)}{(\omega_p^2 - \omega_c^2 + \sigma^2 - 2d\omega\cdot\omega_c - d\omega^2) - 2j\sigma(\omega_c + d\omega)}$$

If it is assumed that $d\omega \ll \omega_c$, the latter can be approximated by:

$$H(j\{\omega_c + d\omega\}) \approx g\frac{j\omega_c}{(\omega_p^2 - \omega_c^2 + \sigma^2 - 2d\omega\cdot\omega_c) - 2j\sigma\omega_c}$$

Finally, this can be manipulated into:

$$H(j\{\omega_c + d\omega\}) \approx \frac{1}{2}g\frac{1}{j\cdot d\omega - \left(\sigma + j\frac{\omega_p^2 - \omega_c^2 + \sigma^2}{2\omega_c}\right)} \equiv g_{BB}\frac{1}{j\cdot d\omega - p_{BB}}$$

The right-hand side of the last equation suggests a baseband description of the two-pole system, with $d\omega$ as frequency parameter:

$$H_{BB}(d\omega) \equiv H(j\{\omega_c + d\omega\}) \approx g_{BB}\frac{1}{j\cdot d\omega - p_{BB}} \qquad (1)$$

with $$g_{BB} = \frac{1}{2}g; \text{ and } p_{BB} = \sigma + j\frac{\omega_p^2 + \sigma^2 - \omega_c^2}{2\omega_c}$$

Consistent with various embodiments of the present disclosure, a time-discrete model is used for a single-pole continuous system. In this model a time-continuous single-pole system described by:

$$H_s(s) = \frac{g_{BB}}{j \cdot s - p_{BB}}$$

can be shown to have a step response $y_s(t)$ of:

$$y_s(t) = \frac{g_{BB}}{p_{BB}}(e^{p_{BB}t} - 1) \cdot u(t)$$

with u(t) the unit step function.

A sampled version of this system can be described in the z-domain by equating the continuous step response versus the sampled step response (the so-called step-invariant method). The sampled version of the step response would then become:

$$y_z(n) = \frac{g_{BB}}{p_{BB}}\{(e^{p_{BB}T})^n - 1\} \cdot u(nT)$$

Substituting t by n·T, n being the sample number and T the time between samples, the z-transform of $y_z$ is given by:

$$Y_z(z) = \frac{z}{z-1} \cdot \frac{g_{BB}}{p_{BB}} \frac{e^{p_{BB}T} - 1}{z - e^{p_{BB}T}}$$

An equivalent discrete-time transfer function $H_z(z)$ can finally be derived from the knowledge that $Y_z(z)$ represents a step response:

$$H_z(z) = \frac{g_{BB}}{p_{BB}} \frac{e^{p_{BB}T} - 1}{z - e^{p_{BB}T}} \equiv \frac{g_z z^{-1}}{1 - p_z z^{-1}}$$

which represents a single-pole time-discrete transfer function. In that equation, the following definitions were used:

$$g_z = \frac{g_{BB}}{p_{BB}}(e^{p_{BB}T} - 1); \text{ and } p_z = e^{p_{BB}T}$$

Sequentially using equation:

$$g_{BB} = \frac{1}{2}g; \text{ and } p_{BB} = \sigma + j\frac{\omega_p^2 + \sigma^2 - \omega_c^2}{2\omega_c}$$

and then equation:

$$g_z = \frac{g_{BB}}{p_{BB}}(e^{p_{BB}T} - 1); \text{ and } p_z = e^{p_{BB}T}$$

on the result, the complex conjugate pole pair can be moved (modeled) into the time-discrete baseband domain, resulting in a single-pole system.

Aspects of the present disclosure are also directed towards the use of adaptive tuning for the resonating frequency of the antenna of a NFC communications device. Exact tuning of the resonator to the carrier frequency (equal to 13.56 MHz in ISO14443 systems) is important for energy efficiency, since most of the energy is transferred by the carrier (as opposed to the data spectrum around the carrier). Exact tuning of the resonator can be especially challenging since the presence of one (or even more than one) PICC in the PCD's magnetic field changes the self-resonance frequency of the PCD antenna and is a function of the position of the PICC in the field, which cannot be predicted beforehand in most systems. This can be particularly problematic for NFC systems where the high coupling factor of the antennas has the potential to produce large detuning. Moreover, the characteristic of the PCD resonator itself, including its resonance frequency, may not be completely known a priori, e.g., due to parameter spread.

As discussed above, an adaptive pre-equalizer operating in the digital domain can be used to compensate for ISI. Even though such an adaptive system battles ISI by adaptively pre-equalizing the antenna resonator, improvements to the transfer of the carrier power to the PICC can be obtained by physically tuning the antenna resonator to the carrier frequency in an adaptive manner, thus countering the detuning effect. Aspects of the present disclosure are therefore directed towards an adaptive equalizer scheme that includes analog physical antenna tuning for improved power transfer. The antenna tuning scheme can also be useful for reducing the complexity of the digital equalizer hardware.

In particular embodiments of the present disclosure, the coefficients of a finite impulse response (FIR) filter are continually adjusted to create an overall frequency-independent sampled transfer function, thus pre-equalizing the ISI under unknown and varying channel conditions. Aspects of the present disclosure recognize that the adaptive filter coefficients provide information about the antenna detuning, which is used to counter said detuning by physically changing a capacitive element of the antenna resonator. In various embodiments, the hardware of the digital filter is reduced, e.g., the output of the adaptation rule implementation directly tunes the antenna resonator.

Consistent with particular embodiments of the present disclosure, the imaginary part of the time-discrete pole in the transceiver chain model is a measure of the detuning of the antenna resonator. Once the adaptive pre-equalizer coefficients have fully converged, the zero of the FIR filter is on top of the pole of the channel model. This means that the imaginary part of the FIR zero can be used as measure for the amount of resonator detuning. Using this realization, the output of the adaptation rule block can be used to physically tune the antenna such that its resonance frequency equals the carrier frequency, even in the presence of a PICC in the emitted field.

Embodiments of the present disclosure use the FIR implementation given by FIG. 3. In this FIR implementation, the location of the zero is at $z = -w_2$ ($w_1$ does not influence the zero position). The imaginary part of the zero is therefore simply given by $-\text{Im}(w_2)$. Note that in FIG. 3, $\text{Im}(w_2)$ is labeled $w_{2,q}$.

Figure 5:
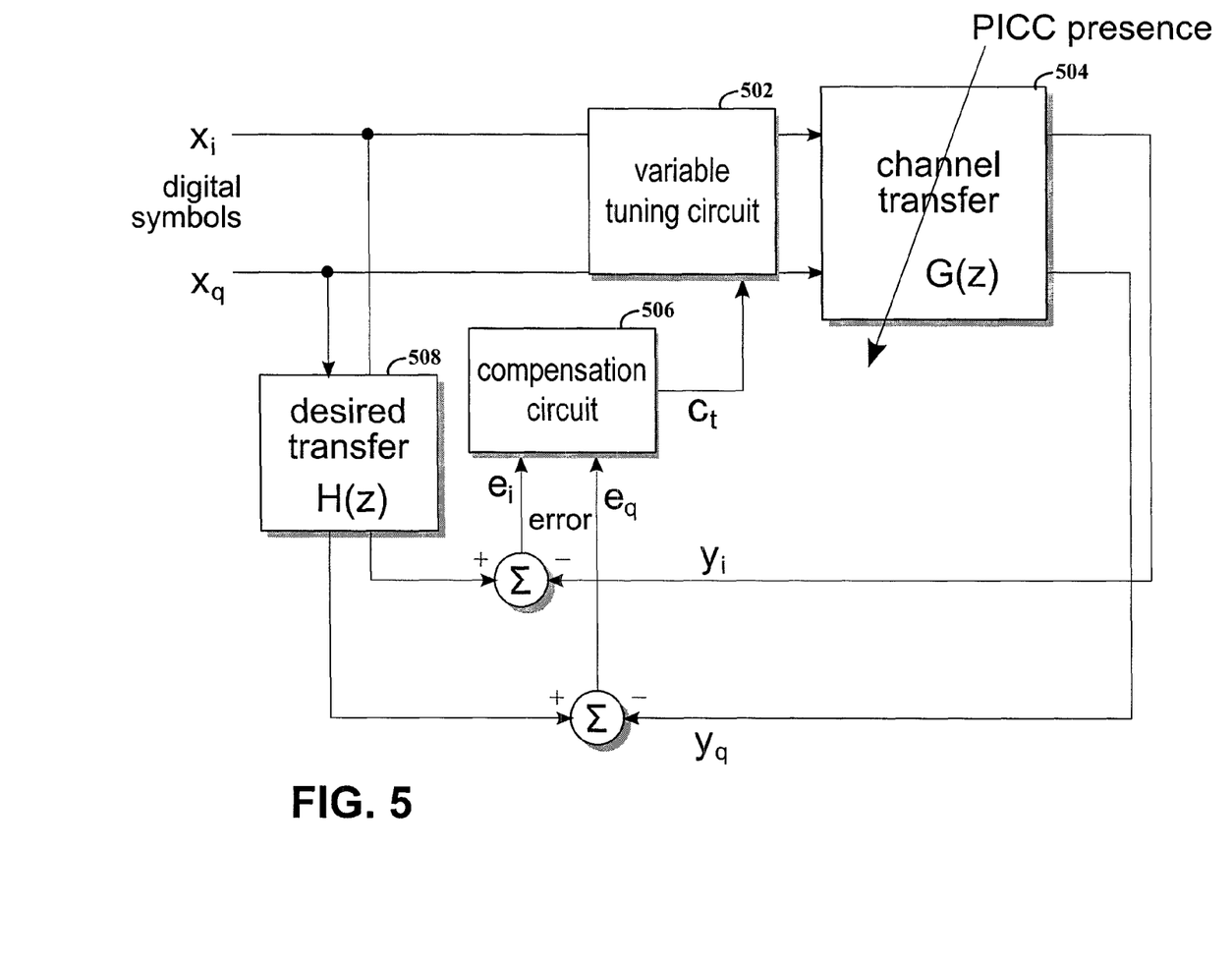
FIG. 5 depicts a block diagram for a device that includes an antenna circuit that has an adjustable resonance frequency, consistent with embodiments of the present disclosure.

FIG. 5 depicts a block diagram for a device that includes an antenna circuit that has an adjustable resonance frequency, consistent with embodiments of the present disclosure. A variable tuning circuit 502 provides an adjustable tuning element. The adjustable tuning element allows for modification of a resonance frequency of an antenna circuit in response to an input signal $C_t$. In certain embodiments of the present disclosure, the variable tuning circuit 502 varies the amount of capacitance that is linked to the antenna circuit in order to modify the resonance frequency of the antenna circuit. This can be accomplished in a number of manners including, but not necessarily limited to, a plurality of switchable capacitors or a varicap diode.

Data signals $x_i$ and $x_q$ represent the digital symbols to be transmitted. A difference between a desired transfer function $H(z)$ 508 and the actual channel transfer function $G(z)$ 504 is provided to compensation circuit 506. Compensation circuit 506 generates the input signal $C_t$. More particularly, the input signal $C_t$ represents a change to the value of the adjustable tuning element in response to a difference between a desired resonance frequency and the actual resonance frequency.

Figure 6:
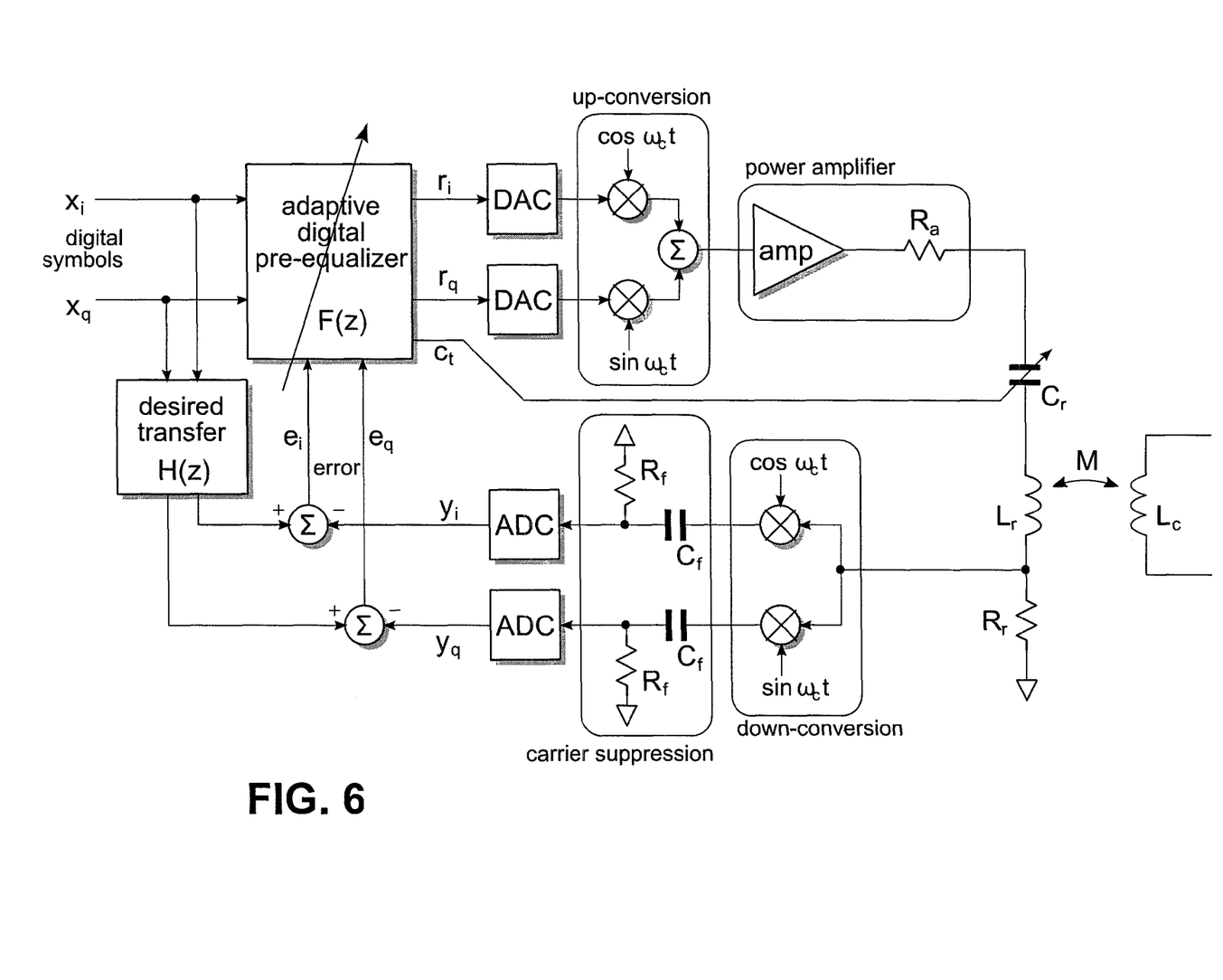
FIG. 6 depicts a block diagram of a PCD including receiver hardware, a pre-equalizer block and a tunable resonance frequency circuit, consistent with embodiments of the present disclosure.

FIG. 6 depicts a block diagram of a PCD, including receiver hardware, a pre-equalizer block and a tunable resonance frequency circuit, consistent with embodiments of the present disclosure. The components of the PCD are largely similar to those discussed in connection with various other figures, including FIG. 4. In the circuit of FIG. 6, the capacitive part $C_r$ of the resonator is adjusted, based on the value of $w_{2,q}$. In particular embodiments, the capacitive adjustment can be done using a digital-to-analog converter controlling a varicap diode (a variable capacitance diode) or using a digitally controllable capacitor directly (e.g., based on a bank of switchable capacitors).

The capacitor in FIG. 6 can be part of a passive network (for example an antenna matching network). The single tunable capacitor can also be implemented as a combination of a fixed capacitor(s) and a tunable capacitor(s) (e.g., trading accuracy for tuning range).

Figure 7:
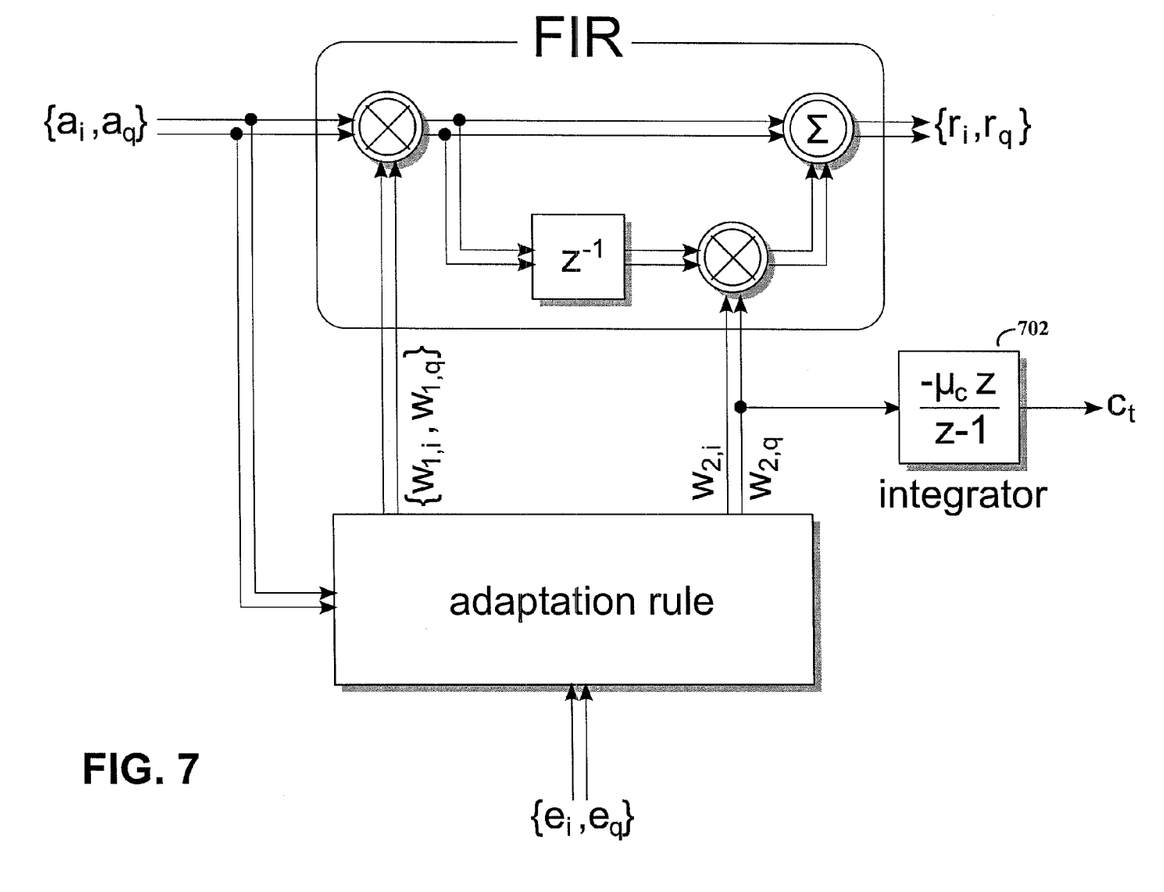
FIG. 7 depicts a block diagram for an adaptive pre-equalizer with a tuning output, consistent with embodiments of the present disclosure.

FIG. 7 depicts a block diagram for an adaptive pre-equalizer with a tuning output, consistent with embodiments of the present disclosure. In FIG. 7, the imaginary component of $w_2$ is fed through a digital integrator (accumulator) 702 with some adaptation gain $\mu_c$. The integrator delivers the tuning signal $C_t$ that is used to control the tuning capacitor's value. As the integrator is part of a closed feedback loop, it forces $w_{2,q}$ (at the integrator input) to converge to zero. Since the zero of the FIR filter is converging to coincide with the time-discrete baseband pole (which is also variable now that the resonator is tuned) the discrete-time baseband pole will be real-valued after convergence. This means that the resonance frequency after convergence equals the system carrier frequency $\omega_c$. After convergence the pre-equalizer still takes care of bandwidth limitations caused by the real part of the pole. The tuning, instead, has been corrected in the analog domain.

Figure 8:
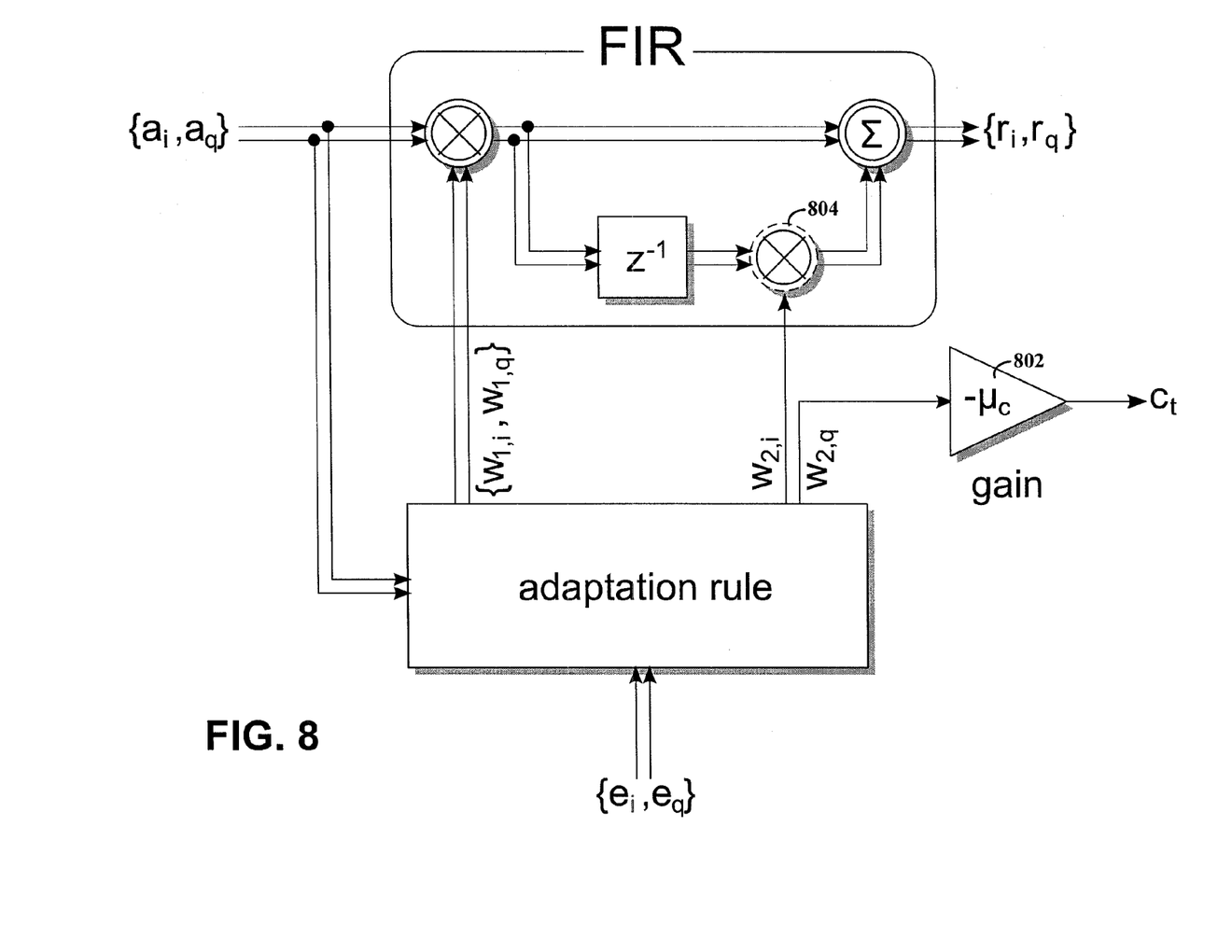
FIG. 8 depicts a block diagram for an adaptive pre-equalizer with a tuning output and a gain cell, consistent with embodiments of the present disclosure.

FIG. 8 depicts a block diagram for an adaptive pre-equalizer with a tuning output and a gain cell, consistent with embodiments of the present disclosure. The multiplier 804, with the dashed outer circle, represents a half-complex multiplier. Rather than an integrator, as in FIG. 7, a gain cell 802 is used for stability reasons. The tuning error, even when using this gain cell, still goes to zero due to the integration already present in the update rule for $w_2(2)$.

Figure 9:
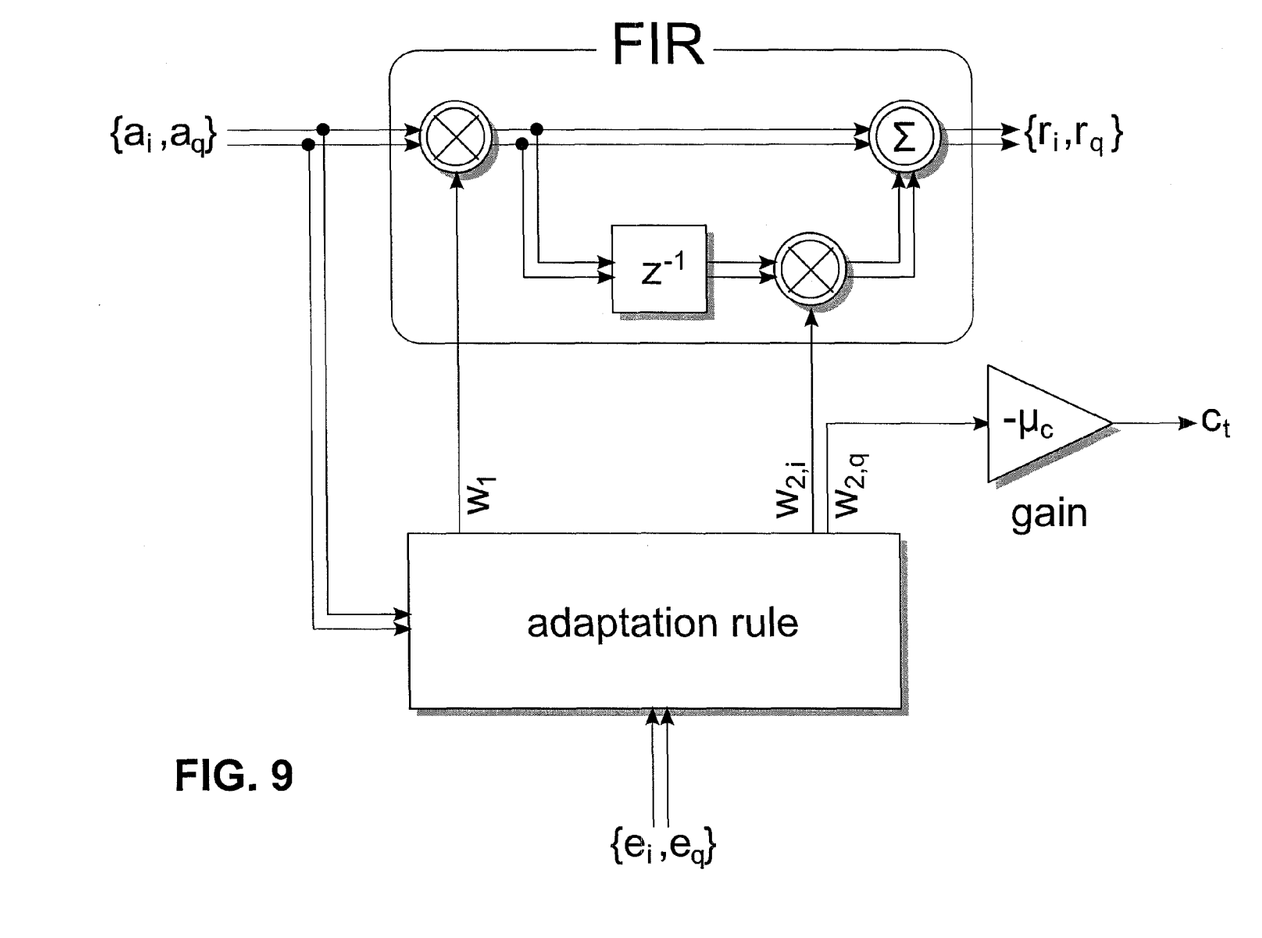
FIG. 9 depicts a block diagram for an adaptive pre-equalizer with a tuning output, a half-duplex multiplier and a gain cell, consistent with embodiments of the present disclosure.

FIG. 9 depicts a block diagram for an adaptive pre-equalizer with a tuning output, a half-duplex multiplier and a gain cell, consistent with embodiments of the present disclosure. Aspects of the present disclosure recognize that the number $w_1$ loses its imaginary part after convergence. Therefore, the corresponding multiplier can be reduced to a half-duplex multiplier, resulting in the implementation shown in FIG. 9. The adaptation rule for the (real-valued) $w_1$ can then be reduced to:

$$w_1(n)=w_1(n-1)+\mu_1 \operatorname{Re}[e(n)\{x^*(n-1)+w_2^*(n-1)x^*(n-2)\}]$$

and the hardware of the adaptation rule block can be reduced accordingly.

Experimental aspects of the present disclosure have been tested using a variety of simulations. For instance, simulations were tested for a system of FIG. 6 (including carrier suppression), where the analog chain, including DACs, ADCs as well as the carrier suppressing high-pass filter, were modeled in the time-discrete baseband domain. The antenna resonator had a quality factor equal to 18 (including the effect of $R_a$) and was mistuned 200 kHz above the carrier frequency of 13.56 MHz. The initial setting of the pre-equalizer was for an antenna quality factor of 12 and no mistuning. PSK-modulated random symbols were used that had a data rate of 6.78 Mbit/s at a symbol rate of 1.695 Msym/s. The DAC and ADC used a sample time of 3.39 Msample/s (twice the symbol rate). The corner frequency of the carrier suppressing high-pass filter was about 10 kHz.

The update rule that was applied in order to adapt the equalizer's gain, zero location and capacitor tuning was:

$$w_1(n)=w_1(n-1)\mu_1 e(n)\{x^*(n-1)+w_2^*(n-1)x^*(n-2)\}$$

$$w_2(n)=w_2(n-1)+\mu_2 e(n)w_1^*(n-1)x^*(n-2) \quad (2)$$

$$c_t(n)=c_t(n-1)-\mu_c \operatorname{Im}\{w_2(n)\}$$

with $\mu_1$ and $\mu_2$ update gain constants. The raised asterisk operator indicates complex conjugation.

The trajectory of the equalizer zero from its starting point to the target position was tracked. During convergence, the time-discrete baseband pole was shown to be changing, due to the tuning process, toward the real axis. After convergence, the pole and zero coincided on the real axis, meaning that ISI has been counteracted and the resonator has been tuned to the carrier frequency. The inverse of the equalizer gain ($1/w_1$) should converge to $g_z$. The value of $g_z$ itself is also changing toward the real axis during convergence due to the tuning process.

The hybrid tuning solution was compared to a full-digital adaptive pre-equalizer without tuning. Although both solutions place the FIR zero on top of the channel pole and result in ISI free transmission, the tuning solution moves the pole at the same time such that the resonator is tuned, resulting in an power-efficient PCD system. This tuning behavior has shown that the initially detuned PCD antenna was (re)tuned to the carrier frequency of 13.56 MHz.

The magnitude of the error, given by $\sqrt{(e_i^2+e_q^2)}$ diminished due to an increasingly better equalization (the FIR filter matching the channel after convergence).

Based upon the above simulation, the tuning system will (when converged) remove the imaginary part of the time-discrete baseband pole in the transceiver. Accordingly, it is possible to simplify the digital pre-equalizer structure according to the above mentioned embodiments of FIGS. 8 and 9. For instance, after convergence, factor $w_{2,q}$ will have converged to zero. Therefore it is possible to use a half-complex multiplier for tap 2 (multiplying a complex number by a real). This roughly halves the required hardware for that particular multiplier.

Simulation results suggest that the reduced solution produces a jagged version of the convergence curve. Without being bound by theory, this is believed to be due to the fact that the integrator needed to be replaced by a gain for stability reasons, thus losing some high-frequency filtering on the tuning signal.

The signals and associated logic and functionality described in connection with the figures can be implemented in a number of different manners. Unless otherwise indicated, various general purpose systems and/or logic circuitry may be used with programs in accordance with the teachings herein, or it may prove convenient to construct a more specialized apparatus to perform the required method. For example, one or more of the methods according to the present disclosure can be implemented in hard-wired circuitry, by programming a general-purpose processor, other fully or semi-programmable logic circuitry, and/or by a combination of such hardware and a general-purpose processor configured with software.

One of skill in the art would appreciate that aspects of the disclosure can be practiced with computer/processor-based system configurations other than those expressly described herein. The required structure for a variety of these systems and circuits would be apparent from the intended application and the above description.

It is to be understood that various terms and techniques are used by those knowledgeable in the art to describe communications, protocols, applications, implementations, mechanisms, etc. One such technique is the description of an implementation of a technique expressed in terms of an algorithm or mathematical expression. That is, while the technique may be, for example, implemented as executing code on a computer, the expression of that technique may be more aptly and succinctly conveyed and communicated as a formula, algorithm, or mathematical expression.

Thus, one skilled in the art would recognize a block denoting "C=A+B" as an additive function whose implementation in hardware and/or software would take two inputs (A and B) and produce a summation output (C), such as in combinatorial logic circuitry. Thus, the use of formula, algorithm, or mathematical expression as descriptions is to be understood as having a physical embodiment in at least hardware (such as a processor in which the techniques of the present disclosure may be practiced as well as implemented as an embodiment).

In certain embodiments, machine-executable instructions can be stored for execution in a manner consistent with one or more of the methods of the present disclosure. The instructions can be used to cause a general-purpose or special-purpose processor that is programmed with the instructions to perform the steps of the methods. Alternatively, the steps might be performed by specific hardware components that contain hardwired logic for performing the steps, or by any combination of programmed computer components and custom hardware components.

In some embodiments, aspects of the present disclosure may be provided as a computer program product which may include a machine or computer-readable medium having stored thereon instructions which may be used to program a computer (or other electronic devices) to perform a process according to the present disclosure. Accordingly, the computer-readable medium includes any type of media/machine-readable medium suitable for storing electronic instructions.

Based upon the above discussion and illustrations, those skilled in the art will readily recognize that various modifications and changes may be made to the present disclosure without strictly following the exemplary embodiments and applications illustrated and described herein. For example, a number of different FIR filter solutions can be implemented beyond those expressly depicted. Such modifications do not depart from the true spirit and scope of the present disclosure, including that set forth in the following claims. Furthermore, the term "example" as used throughout this document is by way of illustration, and not limitation.

What is claimed is:

1. A device for wirelessly communicating using an antenna, the device comprising:
a transmission circuit configured and arranged to transmit a first wireless signal using magnetic coupling between the antenna and a remote device, the coupling occurring over a wireless medium;
a receiver circuit configured and arranged to receive a second wireless signal that is from the antenna and that represents the first wireless signal as modified by the coupling occurring over the wireless medium;
an error circuit configured and arranged to generate an error signal by comparing the first wireless signal to the second wireless signal; and
an equalizer circuit configured and arranged to pre-code the first wireless signal with coding that compensates for inter-symbol interference by compensating for the error signal.

2. The device of claim 1, wherein the transmission circuit is further configured and arranged to format the first wireless signal according to a near-field communications protocol operating at data speeds of at least one Mbit/s.

3. The device of claim 1, wherein the transmission circuit is further configured and arranged to generate two data signals $x_i$ and $x_q$ for use in a phase-shift keying (PSK) protocol.

4. The device of claim 1, further including a finite-infinite response (FIR) filter configured and arranged to generate complex coefficients from the error signal, wherein the complex coefficients are generated to result in a frequency-independent transfer function resulting from the precoding and the coupling occurring over the wireless medium.

5. The device of claim 1, further including a finite-infinite response (FIR) filter configured to include two zeros in transfer function of the FIR filter.

6. The device of claim 1, further including a transfer function circuit that is configured and arranged to modify the first data signal according to a desired transfer function and wherein the error circuit is configured and arranged to compare the modified first data signal to the second wireless signal.

7. The device of claim 6, further including a high-pass filter configured and arranged to suppress a carrier signal in the second wireless signal and wherein transfer function circuit is further configured and arranged to include a model of the high-pass filter in the desired transfer function.

8. The device of claim 1, wherein the transmission circuit is further configured and arranged to format the first wireless signal according to a near-field communications protocol operating at data speeds of up to at least a data rate of 6.78 Mbit/s at a symbol rate of at least 1.695 Msym/s.

9. The device of claim 1, further including a tuning circuit configured and arranged to adjust a resonant frequency of the antenna in response to the error signal.

10. The device of claim 9, wherein the tuning circuit is configured and arranged to adjust the resonant frequency of the antenna by changing the value of a capacitive load connected to the antenna.

11. The device of claim 9, wherein the tuning circuit includes one of a varicap diode and a switched bank of capacitors.

12. The device of claim 9, wherein the tuning circuit is configured and arranged to integrate an imaginary component, $w_{2,q}$, of the error signal, and to use the result of the integration to control a tuning capacitor's value and thereby forcing the imaginary component $w_{2,q}$ to converge to zero.

13. A bidirectional wireless communications device comprising:
a transmit path including
an equalizer circuit configured and arranged to pre-code a first digital data with coding that compensates for inter-symbol interference that is represented by an error signal;

a digital to analog converter circuit configured and arranged to produce an analog transmit signal from the pre-coded first digital data;

an up-conversion circuit configured and arranged to generate a passband signal by adding a carrier frequency component to the analog transmit signal; and an amplifier circuit configured and arranged to provide an amplified version of the passband signal to an antenna; and a receive path including a down-conversion circuit configured and arranged to generate an analog receive signal by removing a carrier frequency component from the passband signal;

an analog to digital converter circuit configured and arranged to produce second digital data from the analog receive signal; and an error circuit configured and arranged to generate the error signal by comparing the first digital data to the second digital data.

14. The device of claim 13, wherein the digital to analog converter circuit includes the up-conversion circuit and the digital to analog converter circuit is further configured and arranged to add the carrier frequency component in a digital domain.

15. The device of claim 13, wherein the analog to digital converter circuit includes the down-conversion circuit and the analog to digital converter circuit is further configured and arranged to remove the carrier frequency component in a digital domain.

16. The device of claim 13, wherein the transmission path is further configured and arranged to format the first digital data signal according to a near-field communications protocol operating at data speeds of at least one Mbit/s.

17. The device of claim 13, further including a tuning circuit configured and arranged to adjust a resonant frequency of the antenna in response to the error signal.

18. A method comprising:

transmitting, using a transmission circuit, a first wireless signal using magnetic coupling between the antenna and a remote device, the coupling occurring over a wireless medium;

receiving, using a receiver circuit, a second wireless signal that is from the antenna and that represents the first wireless signal as modified by the coupling occurring over the wireless medium;

generating, using an error circuit, an error signal by comparing the first wireless signal to the second wireless signal; and pre-coding, using an equalizer circuit, the first wireless signal with coding that compensates for inter-symbol interference by compensating for the error signal.

19. The method of claim 18, further including a step of adjusting, using a tuning circuit, a resonant frequency of the antenna in response to the error signal.

* * * * *